(12) United States Patent
Wisniewski et al.

(10) Patent No.: US 8,567,816 B1
(45) Date of Patent: Oct. 29, 2013

(54) AIRBAG TEAR SEAM SHAPES

(71) Applicant: Faurecia Interior Systems, Inc., Auburn Hills, MI (US)

(72) Inventors: Aaron Wisniewski, Plymouth, MI (US); Mathew Barr, Clarkston, MI (US); Brian Jacobs, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/720,155

(22) Filed: Dec. 19, 2012

(51) Int. Cl.
B60R 21/20 (2011.01)

(52) U.S. Cl.
USPC ............................................. 280/728.3

(58) Field of Classification Search
USPC .................................. 280/728.1, 728.3, 732
See application file for complete search history.

(56) References Cited

U.S. PATENT DOCUMENTS

| | | | | |
|---|---|---|---|---|
| 5,882,033 A * | 3/1999 | Lachat | | 280/728.3 |
| 6,062,590 A * | 5/2000 | Gallagher | | 280/728.1 |
| 6,322,101 B1 * | 11/2001 | Suizu et al. | | 280/732 |
| 7,025,374 B2 * | 4/2006 | Evans | | 280/728.3 |
| 7,063,349 B2 * | 6/2006 | Takahashi | | 280/728.2 |
| 2004/0160043 A1 * | 8/2004 | Litjens et al. | | 280/732 |
| 2009/0278337 A1 * | 11/2009 | Springer et al. | | 280/728.3 |
| 2011/0148079 A1 * | 6/2011 | Dargavell et al. | | 280/728.3 |
| 2012/0139213 A1 * | 6/2012 | Iseman | | 280/728.3 |
| 2012/0223512 A1 * | 9/2012 | Barr et al. | | 280/728.3 |

* cited by examiner

*Primary Examiner* — Joseph Rocca
*Assistant Examiner* — Robert A Coker
(74) *Attorney, Agent, or Firm* — Reising Ethington P.C.

(57) ABSTRACT

A vehicle interior panel for use over an airbag includes a substrate having an airbag door region and a decorative covering disposed over the airbag door region. A tear seam is formed in the decorative covering along a path having an end portion that is non-orthogonal with respect to a hinge side of the airbag door region. The tear seam path may include a central portion that lies along a side of the airbag door region opposite the hinge side, along with end portions that form obtuse included angles with the central portion. In some cases, the end portions diverge from a perimeter of the airbag door region and may generally extend along high deployment stress regions of the covering. Tear seams formed along such a path may reduce airbag inflation energy losses associated with tearing the covering material(s) during airbag deployment.

13 Claims, 3 Drawing Sheets

AIRBAG TEAR SEAM SHAPES

TECHNICAL FIELD

The present disclosure relates generally to vehicle interior panels for use over airbags and, more particularly, to tear seams formed in such vehicle interior panels.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to control the location of material separation during airbag deployment.

U.S. Pat. No. 6,089,642 to Davis et al. discloses typical tear seam shapes. In each embodiment described in the Davis patent, rectangular airbag doors are concealed beneath a layer of material having a tear seam formed along its underside. The tear seams are formed along the three unhinged sides of the underlying airbag doors. In one example, there is a single rectangular airbag door hinged on one side and a U-shaped tear seam formed in the overlying layer of material. The U-shape follows the shape of the three unhinged sides of the airbag door. In another example, there are two rectangular airbag doors, each hinged on one side, and the tear seam is in an H-shape. The H-shape follows the shape of the dual airbag doors, with the vertical bars of the H-shape following side edges of the airbag doors and the cross-bar of the H-shape following the other unhinged sides of the airbag doors.

SUMMARY

In accordance with one embodiment, a vehicle interior panel for use over an airbag includes a substrate having an outer surface and an airbag door region having a perimeter associated with a deployment opening formed during airbag deployment. A decorative covering is disposed over the outer surface and over the airbag door region of the substrate. A tear seam is formed in the decorative covering along a path having an end portion that diverges from the perimeter of the airbag door region.

In at least one embodiment, the perimeter includes a hinge side along which an airbag door pivots open during airbag deployment and a second side opposite the hinge side. The end portion of the path extends along the covering in a direction toward the hinge side and away from the second side.

In at least one embodiment, at least a portion of the path is generally parallel with a second side of the perimeter.

In at least one embodiment, third and fourth sides of the perimeter extend between hinge and opposite second sides of the perimeter. The path includes a central portion that generally follows the second side of the perimeter and opposite end portions that diverge from the third and fourth sides of the perimeter.

In at least one embodiment, third and fourth sides of the perimeter form respective angles with opposite end portions of the path. Each of the angles is greater than 0 degrees and less or equal to 90 degrees.

In at least one embodiment, the path diverges from the perimeter along a high deployment stress region of the covering.

In at least one embodiment, a portion of the tear seam directly overlies a portion of the perimeter.

In at least one embodiment, the entire tear seam is located outside the perimeter.

In at least one embodiment, the substrate further comprises a second airbag door region having a second perimeter associated with the deployment opening formed during airbag deployment. The end portion of the path diverges from the second perimeter.

In at least one embodiment, two airbag door regions are adjacent one another along a central portion of the path. The path includes four end portions that each extend from the central portion of the path and away from the airbag door regions.

In at least one embodiment, the path is a straight line.

In accordance with another embodiment, a method of making a vehicle interior panel for use over an airbag, includes the steps of: (a) providing a substrate having an airbag door region, the airbag door region having a perimeter associated with a deployment opening formed during airbag deployment; (b) forming a tear seam in a decorative covering along a path so that, when the decorative covering is disposed over the substrate, a portion of the path follows a portion of the perimeter and another portion of the path diverges from the perimeter toward a location outside the airbag door region; and (c) disposing the decorative covering over the substrate.

In at least one embodiment, the covering is disposed over the substrate before the tear seam is formed.

In at least one embodiment, the tear seam is formed along a path that lies entirely outside of the airbag door region when the covering is disposed over the substrate.

In at least one embodiment, the substrate has two airbag door regions that are adjacent along a line of adjacency, and the tear seam is formed so that a portion of the tear seam lies along the line of adjacency when the covering is disposed over the substrate.

In at least one embodiment, the method further includes the step of obtaining information pertaining to the location of a high deployment stress region along the covering. At least a portion of the tear seam is formed along the high deployment stress region.

In accordance with another embodiment, a vehicle interior panel for use over an airbag includes a substrate having an outer surface and an airbag door region having a perimeter associated with a deployment opening formed during airbag deployment. The perimeter includes a hinge side and a second side opposite the hinge side. A decorative covering is disposed over the outer surface and over the airbag door region of the substrate. A tear seam is formed in the decorative covering along a path having a central portion that lies along the second side of the perimeter and end portions extending from opposite ends of the central portion. Each of the end portions forms an obtuse angle with the central portion.

In at least one embodiment, the perimeter of the airbag door region is generally rectangular.

In at least one embodiment, the path lies entirely outside the airbag door region.

In at least one embodiment, the substrate includes a second airbag door region having a second perimeter with a side that lies along the central portion of the path, and the path is a straight line.

DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF ILLUSTRATIVE EMBODIMENT(S)

As will become apparent from the following disclosure, a vehicle interior panel for use over an airbag may be constructed with a tear seam formed along a path having a portion that is non-orthogonal with respect to a hinge side of an airbag door region. The tear seam path may include a central portion that lies along a side of the airbag door region opposite the hinge side, along with one or more end portions that form obtuse angles with the central portion. In some cases, the end portions diverge from a perimeter of the airbag door region and may generally extend along high deployment stress regions of the covering. Airbag tear seams formed as described herein may help reduce airbag inflation energy losses associated with tearing the covering during airbag deployment.

Figure 1:
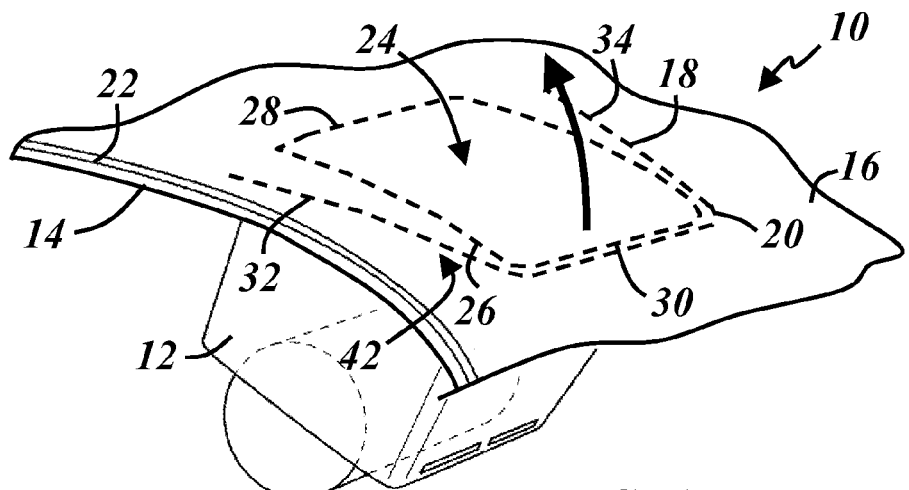
FIG. 1 is partial cutaway view of an instrument panel with an airbag module installed therebeneath and a tear seam formed in the panel, according to one embodiment.

Referring now to FIG. 1, there is shown a cut-away view of one embodiment of a vehicle interior panel 10 with an airbag module 12 installed therebeneath. The portion of the panel 10 shown in the figure is the passenger side of a vehicle instrument panel and includes a substrate 14, a decorative covering 16, and a tear seam 18 formed in the covering. These elements of the panel 10 may be made using known materials and techniques. For example, the substrate 14 may be constructed from an injection-molded thermoplastic material, such as glass-filled polypropylene, or any other material or combination of materials that helps define the overall shape of the panel 10 to support the decorative covering 16. The covering 16 may provide a desired aesthetic to the vehicle interior and may include any number of material layers, such as a decorative skin layer (e.g., leather or a textured polymeric film), a foam cushioning layer, a spacer fabric layer and/or other layers. The covering 16 may include multiple layers laminated together and disposed over and/or attached to the substrate 14 or it may include one or more separately formed layers. In one embodiment, the covering is a bilayer material including a polymeric foam layer laminated with a polymeric skin layer having a grained or textured visible surface.

The tear seam 18 may be a non-visible tear seam formed in the decorative covering 16 via laser scoring, cold or hot knife scoring, ultrasonic scoring, microperforation, machining, or any other method. The tear seam 18 is formed in the covering 16 along a path 20 and generally includes one or more features intended to concentrate stresses in the covering along the path so that the covering material(s) tear at a predictable location during airbag deployment. The tear seam 18 may be a continuous stress concentrator, such as a cut, groove, or score line, formed in one or more of the material layers of the covering 16, or it may include a plurality of individual or spaced-apart cuts or holes arranged along the tear seam path 20. The tear seam 18 may be formed from either side (i.e., visible or non-visible side) of the covering 16, with the stress-concentrating features extending partially or fully through any covering material layer or combination of material layers.

The substrate 14 has an outer surface 22 that faces toward the interior of the vehicle cabin, along with an airbag door region 24 having an outer perimeter 26. The covering 16 is disposed over the outer surface 22 of the substrate 14 and over the airbag door region 24. The airbag door region 24 is an area along the substrate 14 from which an airbag door swings open during airbag deployment to reveal a deployment opening in the substrate through which the airbag enters the vehicle cabin when it inflates. The airbag door may be pre-formed or it may be formed during airbag deployment. For example, the substrate 14 may be weakened along a portion of the perimeter 26 by laser scoring or machining, or it may have a notch, groove or some other stress-concentrator as a molded-in feature located along perimeter 26 so that the substrate material separates along the weakened perimeter during airbag deployment to form the airbag door. Alternatively, the substrate 14 may include a molded-in gap along a portion of the perimeter 26 that defines edges of the airbag door, or the airbag door may be a separate component attached to the substrate by a hinge or tether. In another example, the airbag door region 24 is defined by an opening in the substrate 14, and the airbag door is part of the underlying airbag module 12.

The perimeter 26 represents the outer shape of the airbag door region 24 and is associated with the deployment opening during airbag deployment—i.e., some portion of the perimeter 26 may be shared with the perimeter of the deployment opening formed during airbag deployment. The perimeter 26 includes a hinge side 28 along which the airbag door pivots open during airbag deployment. In the example of FIG. 1, the perimeter includes a second side 30 opposite the hinge side 28. The second side 30 corresponds to a front or leading edge of the airbag door that swings open in the direction indicated by the arrow in FIG. 1. As illustrated, the tear seam path 20 extends along the covering 16 so that end portions 32, 34 of the path are non-orthogonal with respect to the hinge side 28 and the opposite second side 30 of the perimeter 26 of the airbag door region 24. Various tear seam paths and airbag door region perimeters are illustrated in FIGS. 2-6, along with their respective shapes and relative locations.

Figure 2:
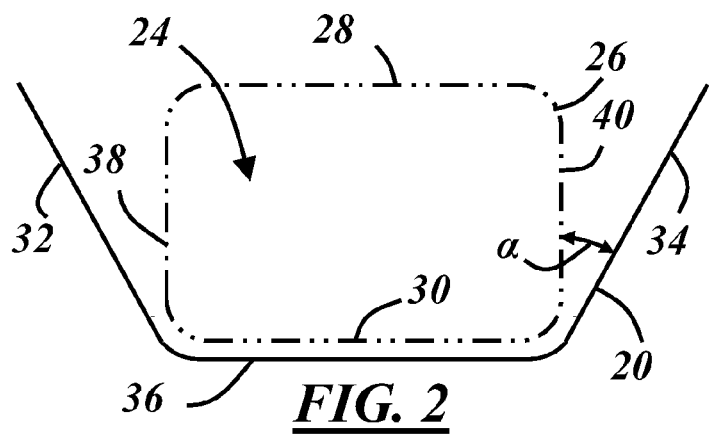
FIG. 2 is a plan view of an airbag door region and an exemplary tear seam path that diverges from the perimeter of the airbag door region.

With reference to FIG. 2, the perimeter 26 of the airbag door region 24 and the tear seam path 20 of FIG. 1 are illustrated in plan view, with the perimeter indicated in phantom and the tear seam path indicated as a solid line. In this embodiment, each of the end portions 32, 34 of the path 20 diverges from the perimeter 26 as the path extends along the covering in a direction away from the second side 30 and toward the hinge side 28 of the perimeter. A central portion 36 of the tear seam path 20 is located along and generally parallel with the second side 30 of the perimeter 26. In this particular example, the perimeter 26 also includes third and fourth sides 38, 40 that extend between the hinge side 28 and the second side 30 so that the shape of the perimeter is generally rectangular and the end portions 32, 34 diverge from the third and fourth sides 38, 40. An angle of divergence α is defined between each pair of end portions 32, 34 and sides 38, 40. The angle α is greater 0 degrees and less than or equal to 90 degrees and may depend on several factors, including the particular geometry of the airbag door region 24, for example. In one embodiment, the angle α is in a range from 15 to 75 degrees. In another embodiment, the angle α is in a range from 30 to 60 degrees. In another embodiment, the angle α is greater than 0 degrees and less than or equal to 60 degrees. Other possible ranges for the angle of divergence a include 5 to 30 degrees, 5 to 45 degrees, 5 to 60 degrees, 5 to 75 degrees, 30 to 45 degrees, 30 to 75 degrees, 45 to 60 degrees, 45 to 75 degrees, and 60 to 75 degrees. Where the tear seam path 20 and/or the perimeter 26 are curved where they diverge, the angle α may be variable and determined by the angle between tangent lines constructed along the curve(s).

In one embodiment, at least a portion of the tear seam 18 is located along a high deployment stress region 42 of the covering 16 (shown in FIG. 1). Region 42 is a localized portion of the covering 16 along which the maximum covering stresses are located during airbag deployment, even in the absence of the tear seam 18. In other words, as the underlying airbag door swings open during airbag deployment under the force of the expanding airbag, the stress distribution along the covering is non-uniform near the airbag door region. Moreover, the maximum stresses do not necessarily directly overlie the edges of the airbag door. It has been found that the maximum covering stresses may lie along a line or path that extends away from the airbag door region 24 and along the covering in a direction that is non-orthogonal with the hinge side 28 of the perimeter 26 of the airbag door region 24 or with the hinge side of the airbag door. The high deployment stress region 42 is a region located along this line of maximum covering stresses. For example, the region 42 may have a width greater than 0 and less than or equal to 10 mm, 25 mm or 50 mm, with the line of maximum covering stresses located at mid-width. The location of the high deployment stress region may be determined in a number of ways, such as through finite element analysis, experimentation with different angles of divergence, or other empirical methods.

Figure 3:
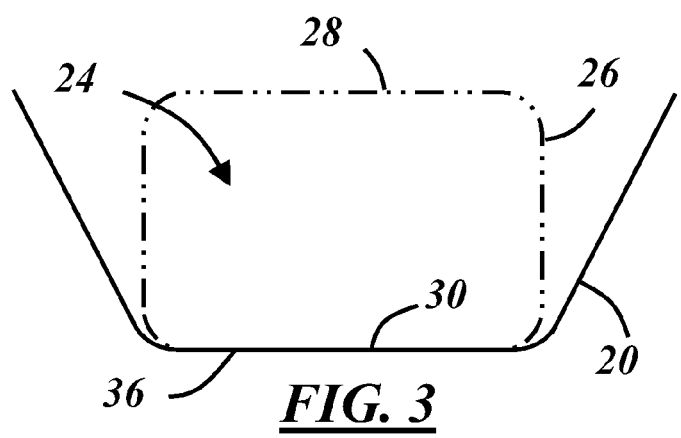
FIG. 3 is a plan view of another example of a tear seam path that diverges from the perimeter of the region of the airbag region of FIG. 2.

The tear seam path 20 of FIGS. 1 and 2 diverges from the perimeter 26 of the airbag door region 24 along the high deployment stress region 42 for a particular covering 16 and airbag door region geometry. Additionally, though the central portion 36 of the tear seam path 20 follows or lies along the second side 30 of the perimeter 26, no portion of the path 20 directly overlies the perimeter 26. The line of maximum covering stresses present during airbag deployment may lie outside of the airbag door region 24 so that the portion of the high deployment stress region associated with the front or leading edge of the airbag door is not centered along the second side 30 of the perimeter 26. The central portion 36 of the tear seam path 20 of FIGS. 1 and 2 is located outside the airbag door region 24 accordingly to help reduce airbag inflation energy losses associated with tearing the covering material(s). Thus the entire tear seam 18 may be located outside the perimeter 26 of the airbag door region 24. As shown in FIG. 3, it is also possible that a portion of the tear seam path 20 directly overlies a portion of the perimeter 26. In this case, the central portion 36 of the path 20 directly overlies the second side 30 of the perimeter 26. The configuration of FIG. 3 may be desirable in some cases, such as where space is limited or where the central portion of the tear seam is formed using the underlying airbag door region as an alignment feature during manufacture.

Figure 4:
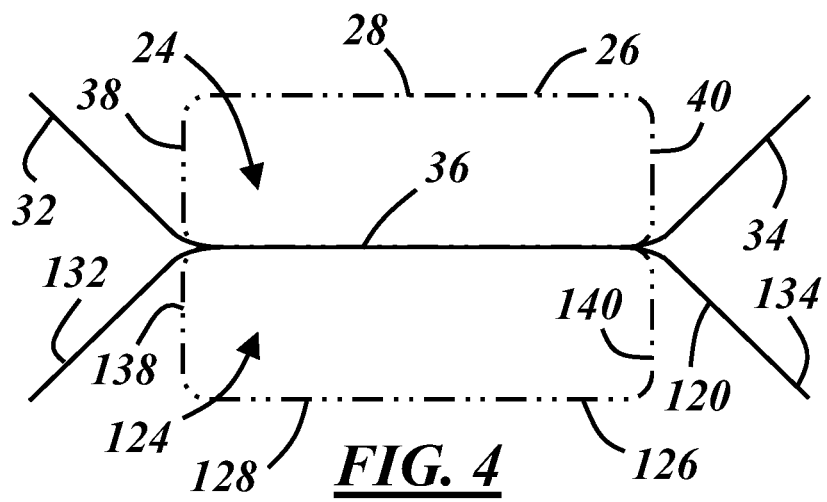
FIG. 4 is a plan view of another example of a tear seam path that diverges from respective perimeters of adjacent airbag door regions.

With reference to FIG. 4, there is shown another example where the central portion 36 of a different tear seam path 120 directly overlies a portion of the perimeter 26 of the airbag door region 24. In this example, the substrate includes first and second airbag door regions 24, 124 having respective perimeters 26, 126. Each perimeter 26, 126 has a respective hinge side 28, 128 along which first and second airbag doors pivot open and away from each other during airbag deployment. In this example, the tear seam path 120 along which the tear seam is formed includes additional end portions 132, 134. Each of the end portions 132, 134 diverges from the second perimeter 126 as it extends along the covering from the central portion 36 of the tear seam path and toward the hinge side 128 of the second perimeter 126. The two regions 24, 124 are adjacent along a line of adjacency, which in this case is along the central portion 36 of the tear seam path 120, located between the hinge sides 28, 128. Thus, the tear seam path 120 of FIG. 4 includes four end portions 32, 34, 132, 134, each extending from the central portion 36 and away from the airbag door regions 24, 124. In this example, each of the end portions diverges from a side of one of the perimeters 26, 126. More particularly, end portion 32 diverges from side 38, end portion 34 diverges from side 40, end portion 132 diverges from side 138, and end portion 134 diverges from side 140 as each end portion extends along the covering toward the respective hinge sides 28, 128 of the first and second perimeters 26, 126. Each end portion 32, 34, 132, 134 may form an angle of divergence with one of the perimeters consistent with the above description, and each angle of divergence may be the same or different.

Figure 5:
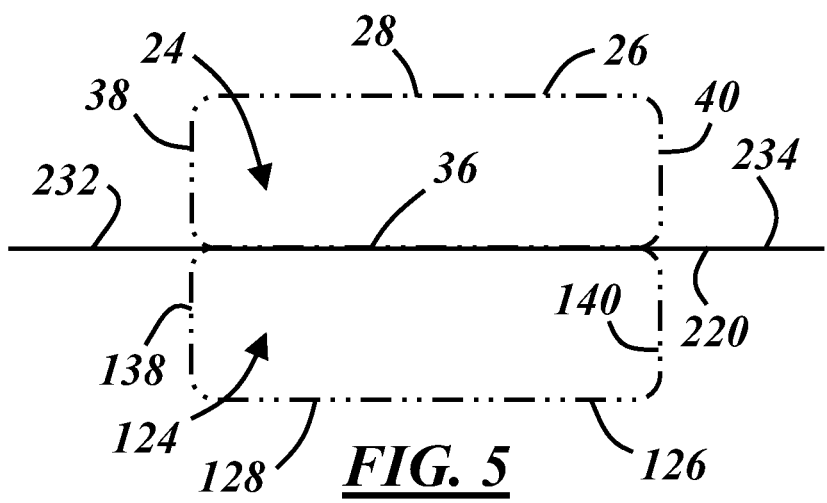
FIG. 5 is a plan view of another example of a tear seam path that diverges from the perimeter of a the adjacent airbag door regions of FIG. 4.

With reference to FIG. 5, there is shown another example where the central portion 36 of a different tear seam path 220 directly overlies a portion of the perimeters 26, 126 of the airbag door regions 24, 124 of FIG. 4. In this example, the tear seam path 220 along which the tear seam is formed includes opposite end portions 232, 234 that extend from the central portion 36 so that the tear seam path 220 is a straight line. Each of the end portions 232, 234 diverges from both of the perimeters 26, 126 at a 90 degree angle of divergence. Thus, the tear seam path 220 of FIG. 5 includes two end portions 232, 234, each extending from the central portion 36 and away from the airbag door regions 24, 124. In this example, end portion 232 diverges from sides 38, 138 of perimeters 26, 126, and end portion 234 diverges from sides 40, 140 of the perimeters. In some cases, the high deployment stress region associated with adjacent airbag door regions lies along a straight line along the line of adjacency.

Figure 6:
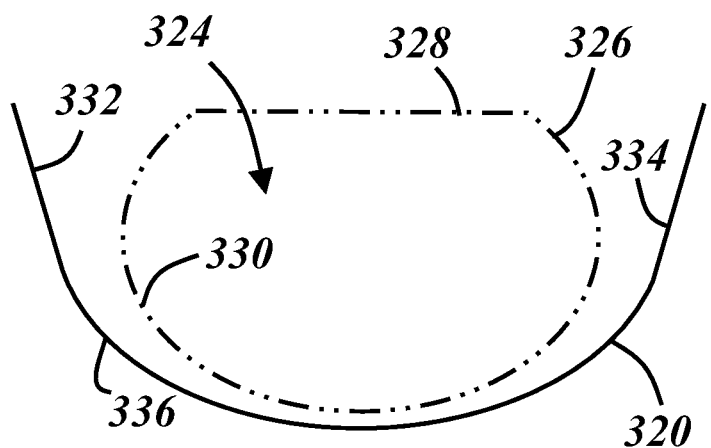
FIG. 6 is a plan view of another example of a tear seam path that diverges from the perimeter of a non-rectangular airbag door region.

FIG. 6 illustrates an example of a non-rectangular airbag door region 324 that may be included in the panel substrate. The perimeter 326 of the illustrated airbag door region 324 includes a hinge side 328 and a curved side 330. A portion of the curved side 330 is opposite the hinge side 328, and ends of the curved side are located at the hinge side. As with the above-described examples of tear seam paths, the illustrated tear seam path 320 diverges from the perimeter 326 of the airbag door region as it extends along the covering toward the hinge side 328 of the perimeter. The location of the tear seam path 320 relative to the perimeter 326 is consistent with the proposition that the high deployment stress region of the covering does not necessarily follow the shape of the airbag door perimeter. In this case, the central portion 336 of the tear seam path 320, as well as each of the end portions 332, 334, diverges from the perimeter 326.

Figure 7:
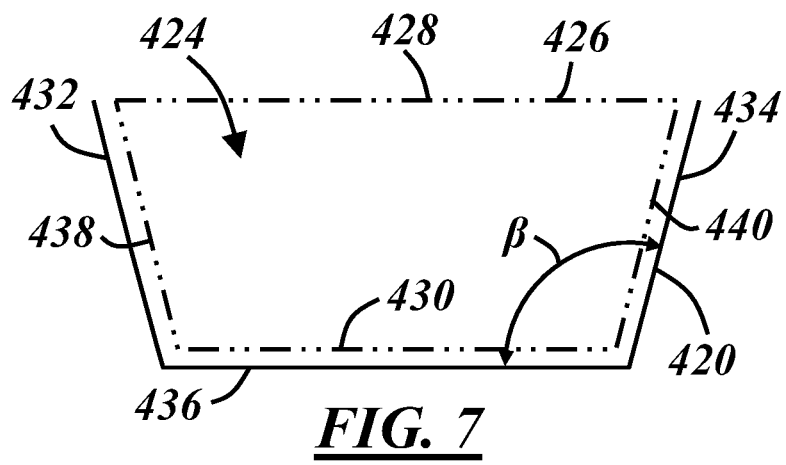
FIG. 7 is a plan view of an exemplary tear seam path with non-orthogonal end portions overlying a non-rectangular airbag door region.

FIG. 7 illustrates yet another example of a non-rectangular airbag door region 424 that may be included as part of the panel substrate. The perimeter 426 of the illustrated airbag door region 424 includes a hinge side 428 and an opposite second side 430, along with third and fourth sides 432, 434 that connect the opposite hinge and second sides. In this example, the second side 430 is shorter than the hinge side 428 so that the overall shape of the perimeter 426 is generally trapezoidal. As with the above-described examples of tear seam paths, the illustrated tear seam path 420 is non-orthogonal with both the hinge side 428 and the opposite side 430 of the perimeter 426. The tear seam path 420 is generally in an open U-shape, similar to those in some of the previously described examples. That is to say that the end portions 432, 434 of the tear seam path 420 (i.e., the upright sides of the U-shape) are non-parallel, diverging as they extend away from the central portion 436 (i.e., the bottom of the U-shape) in a direction toward the hinge side 428 of the perimeter 426. Stated differently, an angle β formed between the central portion 436 of the path 420 and each of the end portions 432, 434 of the path is an obtuse angle (0≤β≤180). The same may be said for the angles formed between the second and third sides 430, 432 and the second and fourth sides 430, 434 of the perimeter 426. As shown in the example of FIG. 7, the tear seam path 420 may lie along or follow the shape of the perimeter 426. In other words, the tear seam path does not necessarily have to diverge from the perimeter of the airbag door region in order to realize the benefits of a non-orthogonal tear seam shape. It is believed that airbag doors and associated airbag door regions of all shapes and sizes may lead to high deployment stress regions that extend away from the side-to-side center of the airbag door region, and that forming tear seams in overlying coverings along a path that follows such high deployment stress regions accordingly can promote better tear seam function and/or reduce airbag deployment energy losses.

A method of making various embodiments of the above-described vehicle interior panel may include the steps of providing the substrate, forming the tear seam in the decorative covering along the desired path, and disposing the covering over the substrate. The tear seam path may be formed so that, when the covering is disposed over the substrate, a portion of the path follows a portion of the perimeter of the airbag door region of the substrate, and another portion of the path diverges from the perimeter toward a location outside the airbag door region. The method may include additional steps, and the steps are not necessarily performed in this order. For example, the step of disposing the covering over the substrate may be performed before forming the tear seam. In particular, the covering may be assembled with the substrate, and the location of the perimeter of the airbag door region may be known. The tear seam may be formed in the assembly by microperforation of the covering or of a layer of the covering from the visible side of the covering along the above described tear seam path. Alternatively, the tear seam may be formed in the decorative covering material(s), after which the formed tear seam is placed over the substrate at the desired location. This method may be used with any airbag door region shape and with any number of airbag door regions, including a pair of airbag door regions that are adjacent along a line of adjacency. Where it is desired to form the tear seam along the high deployment stress region of the covering, the method may further include the step of obtaining information pertaining to the location of the high deployment stress region, including the location of the line of maximum stress. The tear seam may then be formed along a path corresponding to the location of the high deployment stress region.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel for use over an airbag, comprising:
    a substrate having an outer surface and an airbag door region, the airbag door region having a perimeter associated with a deployment opening formed during airbag deployment;
    a decorative covering disposed over the outer surface and over the airbag door region of the substrate; and
    a tear seam formed in the decorative covering along a path having an end portion that diverges from said perimeter, wherein said perimeter includes a hinge side along which an airbag door pivots open during airbag deployment and a second side opposite the hinge side, and said end portion extends along the covering in a direction toward the hinge side and away from the second side.

2. A vehicle interior panel as defined in claim 1, wherein at least a portion of said path is generally parallel with the second side of said perimeter.

3. A vehicle interior panel as defined in claim 1, wherein said perimeter has third and fourth sides extending between the hinge side and the second side, and wherein said path includes a central portion that generally follows the second side of said perimeter and opposite end portions that diverge from the third and fourth sides of said perimeter.

4. A vehicle interior panel as defined in claim 3, wherein the third and fourth sides of said perimeter form respective angles with each of the opposite end portions of said path, and each of the angles is greater than 0 degrees and less than or equal to 90 degrees.

5. A vehicle interior panel as defined in claim 1, wherein said path diverges from said perimeter along a high deployment stress region of the covering.

6. A vehicle interior panel as defined in claim 1, wherein the entire tear seam is located outside said perimeter.

7. A method of making a vehicle interior panel for use over an airbag, comprising the steps of:
    (a) providing a substrate having an airbag door region, the airbag door region having a perimeter associated with a deployment opening formed during airbag deployment;
    (b) forming a tear seam in a decorative covering along a path so that, when the decorative covering is disposed over the substrate, a portion of the path follows a portion of the perimeter and another portion of the path diverges from the perimeter toward a location outside the airbag door region; and (c) disposing the decorative covering over the substrate.

8. The method defined in claim 7, wherein step (c) is performed before step (b).

9. The method defined in claim 7, wherein step (b) includes forming the tear seam along a path that lies entirely outside of the airbag door region when the covering is disposed over the substrate.

10. The method defined in claim 7, further comprising the step of obtaining information pertaining to the location of a high deployment stress region along the covering, wherein step (b) includes forming at least a portion of the tear seam along the high deployment stress region.

11. A vehicle interior panel for use over an airbag, comprising:

a substrate having an outer surface and an airbag door region, the airbag door region having a perimeter associated with a deployment opening formed during airbag deployment, wherein the perimeter includes a hinge side and a second side opposite the hinge side;

a decorative covering disposed over the outer surface and over the airbag door region of the substrate; and a tear seam formed in the decorative covering along a path having a central portion that lies along the second side of said perimeter and end portions extending from opposite ends of the central portion, wherein each of the end portions forms an obtuse angle with the central portion.

12. A vehicle interior panel as defined in claim 11, wherein said perimeter is generally rectangular.

13. A vehicle interior panel as defined in claim 11, wherein said path lies entirely outside the airbag door region.

* * * * *